United States Patent [19]
Lee et al.

[11] Patent Number: 5,308,013
[45] Date of Patent: May 3, 1994

[54] CASSETTE LOADING APPARATUS FOR CASSETTE PLAYER WHICH SMOOTHLY ENGAGES A REEL AND A DRIVING TABLE

[75] Inventors: Jae-su Lee, Seoul; Byeong-sam Son, Suwon, both of Rep. of Korea

[73] Assignee: Samsung Electronics Co., Ltd., Kyungki, Rep. of Korea

[21] Appl. No.: 937,389

[22] Filed: Aug. 31, 1992

[30] Foreign Application Priority Data

Sep. 18, 1991 [KR] Rep. of Korea .................. 91-15342

[51] Int. Cl.⁵ ............................................ G11B 15/26
[52] U.S. Cl. ................................. 242/198; 242/201; 360/96.3
[58] Field of Search ............... 242/197, 198, 199, 200, 242/201; 360/96.3, 96.6

[56] References Cited
U.S. PATENT DOCUMENTS

| | | | |
|---|---|---|---|
| 4,136,843 | 1/1979 | Gourley | 242/198 |
| 4,703,138 | 10/1987 | Suzuki | 200/61.58 |
| 4,825,312 | 4/1989 | Yoshikawa et al. | 360/96.5 |
| 5,054,015 | 10/1991 | Tsukihashi et al. | 360/96.6 |

*Primary Examiner*—Daniel P. Stodola
*Assistant Examiner*—John Q. Nguyen
*Attorney, Agent, or Firm*—Sughrue, Mion, Zinn, Macpeak & Seas

[57] ABSTRACT

A cassette loading apparatus for a cassette player, the apparatus includes a guide protrusion which is rotatably connected with the holder so as to be moved up and down, and with which is capable of connecting a reel hub of the tape reel, and a connection driving body having a connection portion capable of connecting the reel driving table, wherein the connection driving body is connected with the reel driving table when the cassette is loaded, and at the same time is elevated, so that the connection driving body is connected with the reel hub of the tape reel. Thus, the apparatus can avoid the inferior loading of the cassette and minimize noises generated during cassette loading operations.

9 Claims, 2 Drawing Sheets

CASSETTE LOADING APPARATUS FOR CASSETTE PLAYER WHICH SMOOTHLY ENGAGES A REEL AND A DRIVING TABLE

BACKGROUND OF THE INVENTION

The present invention relates to a cassette loading apparatus for a cassette player, and more particularly, relates to an improved cassette loading apparatus for a cassette player capable of preventing an inferior loading of the cassette and of minimizing noise which may occur during cassette loading.

Generally, as shown in FIG. 1, a conventional cassette loading apparatus for a cassette player comprises a reel driving table 13 installed on deck 10, and a cassette holder 11 for loading and unloading a tape cassette 12 on reel driving table 13. Also, reel driving table 13 is composed of a reel pin 14 fixedly installed on deck 10, a reel disc 15 which is rotatably installed on reel pin 14 and of which the outer circumferential surface is provided with a reel gear 15a, a spindle 16 of which the outer circumferential surface is provided with a plurality of guide protrusions 16a, a cap 17 for preventing spindle 16 from being separated and a spring 18 for resiliently biasing spindle 16 upward. Here, reference number 12a designates a tape reel, and 12b designates a reel hub.

In such conventional cassette loading apparatuses for cassette players constructed as described above, cassette holder 11 and spindle 16 of reel driving table 13 are separately installed, and spindle 16 of reel driving table 13 is resiliently biased upward by means of spring 18. F/r this reason, the following problems occur when inserting tape cassette 12 into cassette holder 11, which effectively loads tape reel 12a onto spindle 16. First, when reel hub 12b of tape reel 12a in tape cassette 12 does not match guide protrusion 16a of spindle 16, reel hub 12b will not connect with guide protrusion 16a of spindle 16. Under these circumstances, since spindle 16 is pushed by tape cassette 12, the tape cassette cannot be accurately loaded in place on the spindle.

Also, when spindle 16 has been pressed by the downward force due to the weight of tape cassette 12 with spindle 16 being in an improper place, if guide protrusion 16a of spindle 16 matches with reel hub 12b, spindle 16 is restored by the restoration force of spring 18. In doing so, since spring 18 resiliently biases spindle 16 upward, spindle 16 is abruptly connected with reel hub 12b by the restoration force of spring 18. As a result, noise is generated due to the impact, thereby diminishing the perception of the product's quality.

SUMMARY OF THE INVENTION

Therefore, to solve the defects as described above, it is an object of the present invention to provide an improved cassette loading apparatus for a cassette player capable of preventing an inferior loading of the cassette and of minimizing noise which may occur during cassette loading.

To accomplish the above object of the present invention, there is provided a cassette loading apparatus for a cassette player in which a tape cassette having an internal tape reel is inserted into a moving holder and is moved and loaded together with the holder on a reel driving table for driving the tape reel, said apparatus comprising:

a guide protrusion which is rotatably connected with the holder to move up and down, and capable of connecting to a reel hub of the tape reel; and a connection driving body having a connection portion capable of connecting the reel driving table, wherein the connection driving body is connected with the reel driving table when the cassette is loaded, and at the same time is elevated, so that the connection driving body is connected with the reel hub of the tape reel.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE PREFERRED EMBODIMENT

Figure 1:
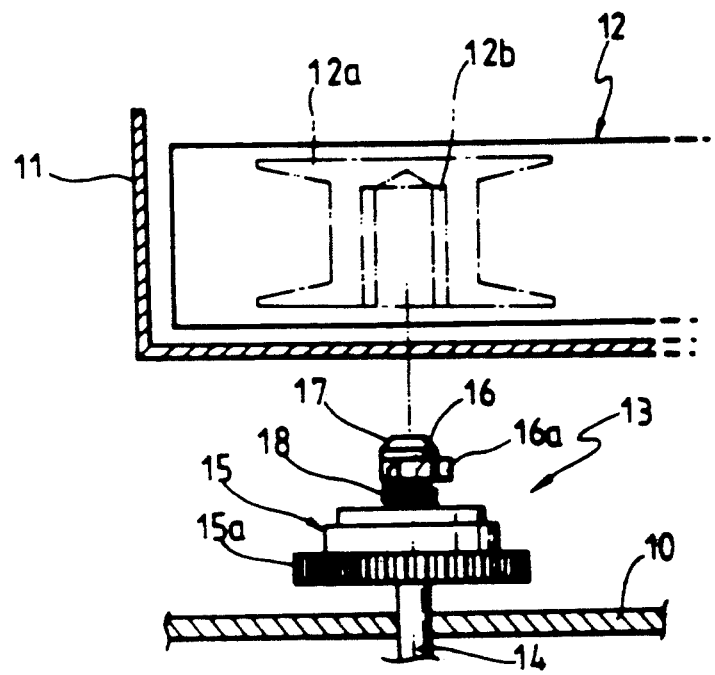
FIG. 1 is a partially cut-away cross-sectional view of the conventional cassette loading apparatus for the cassette player.
Figure 2:
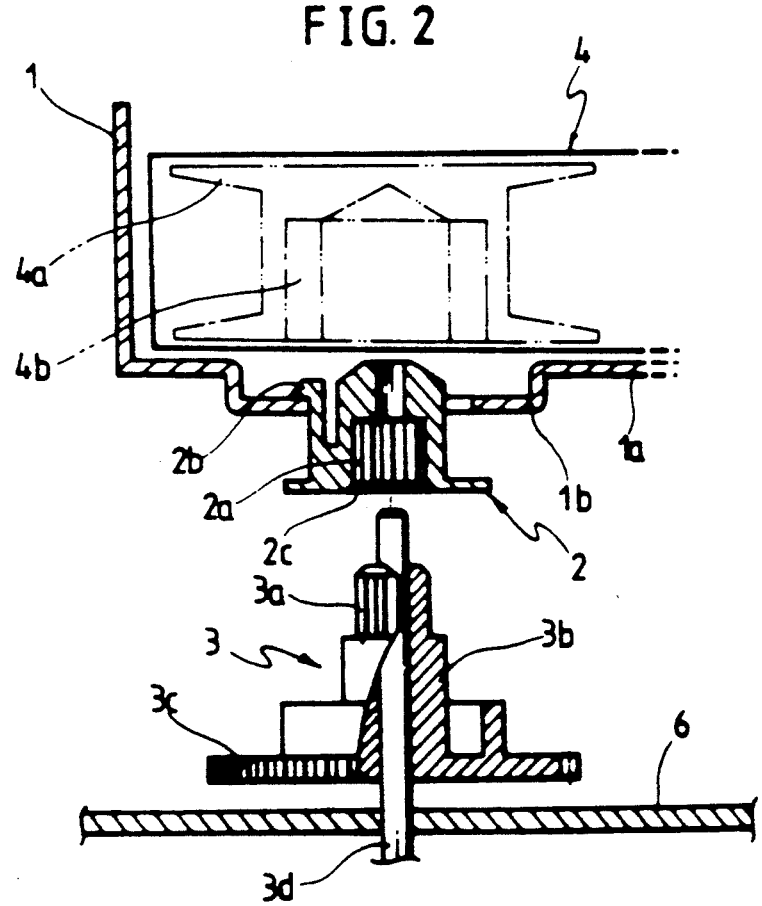
FIG. 2 is a partially cut-away cross-sectional view of one embodiment of a cassette loading apparatus for a cassette player according to the present invention.
Figure 3:
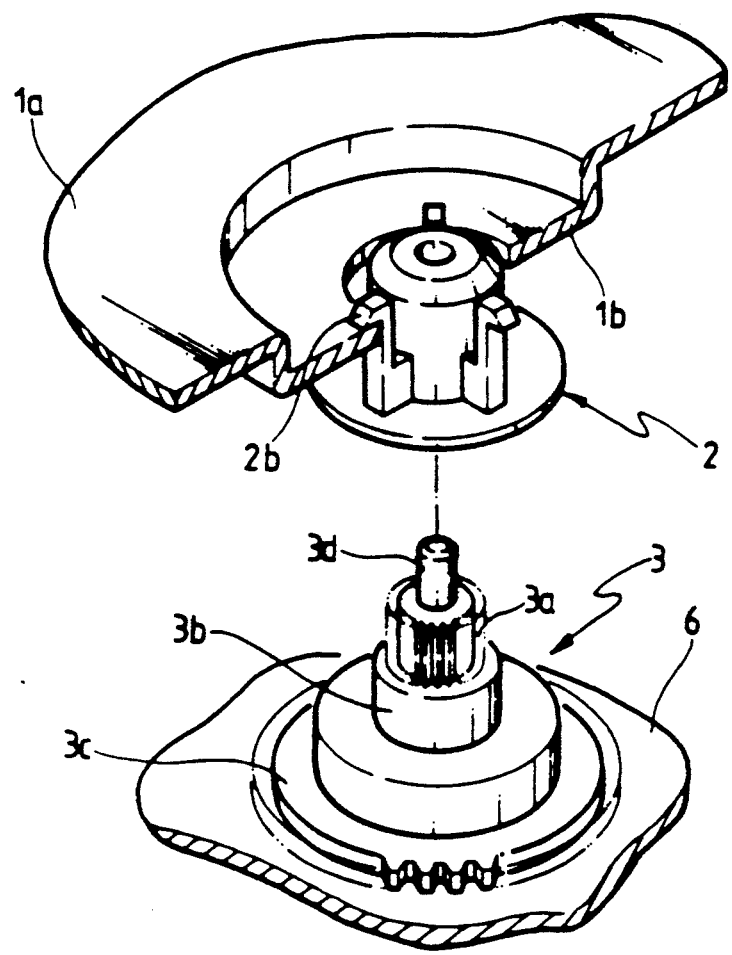
FIG. 3 is a perspective view of the apparatus shown in FIG. 2.

As shown in FIGS. 2 and 3, a cassette loading apparatus for a cassette player according to the present invention, receives a tape cassette 4 having an internal tape reel 4a. A recess portion 1b is formed on a bottom plate 1a of a cassette holder 1 for loading tape cassette 4 on a reel driving table 3 for driving tape reel 4a. A plurality of guide protrusions 2b which are connected with a reel hub 4b of tape reel 4a are formed at predetermined intervals on the outer circumferential surface of recess portion 1b. A connection driving body 2 in which a female gear portion 2a as a connection portion with reel driving table 3 are formed with a predetermined length on the internal bottom of recess portion 1b, is rotatably connected with reel driving table 3, so as to move up and down. Reel driving table 3 is provided with a male gear portion 3a, a central axis 3b and a reel gear 3c. Male gear portion 3a which is connected with female gear portion 2a, is provided on the end of a central axis 3b of a deck 6. Reel gear 3c is formed on the lower and outer circumferential surface of reel driving table 3. Reel driving table 3 is rotatably installed on deck 6 by means of a reel pin 3d.

Figure 4:
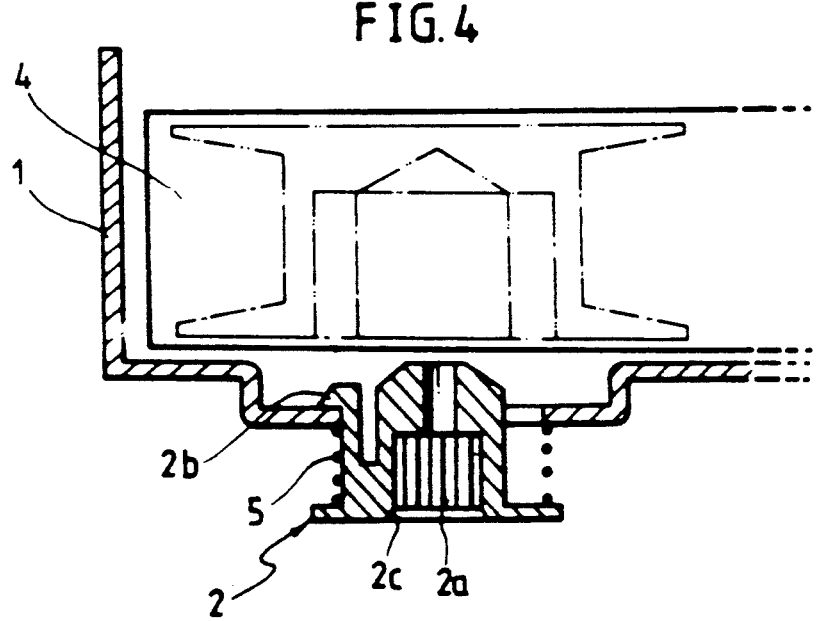
FIG. 4 is a cross-sectional view of another embodiment of the present invention.

FIG. 4 shows another embodiment of the present invention, in which connection driving body 2 is installed in cassette holder 1 so as to be resiliently biased downward by a spring 5.

The cassette loading apparatus of the cassette player according to the present invention as constructed above operates as follows.

When tape cassette 4 in which tape reel 4a is internally installed is inserted into cassette holder 1 and is pressed, cassette holder 1 is advanced to slip over a predetermined interval by means of the conventional driving means (not shown) and guide means, while female gear portion 2a of connection driving body 2 which is connected with cassette holder 1, is connected with male gear portion 3a of reel driving table 3 which is installed in deck 6. This procedure will be explained in more detail as follows.

When cassette holder 1 moves down, first female gear portion 2a of connection driving body 2 which is connected with cassette holder 1, is connected with male gear portion 3a. At this time, female gear portion 2a is smoothly connected with male gear portion 3a by means of a guide slant surface 2c which is formed in female gear portion 2a. When cassette holder 1 moves down further, connection driving body 2 which is connected with cassette holder 1 is, relatively, moved up by reel driving table 3, while guide protrusion 2b which is formed on the outer circumferential surface of reel driving body 2 is connected with reel hub 4b of tape reel 4a. Thus, the cassette loading operation is completed. At this time, since connection driving body 2 is rotatably connected with cassette holder 1, so as to move up and down, even if guide protrusion 2b and reel hub 4b do not match, connection driving body 2 is rotated. Accordingly, guide protrusion 2b formed on connection driving body 2 is smoothly connected with reel hub 4b, and noise generated during loading is minimized.

Also, according to another embodiment of the present invention as shown in FIG. 4, when connection driving body 2 is installed so as to be resiliently biased downward, that is, toward reel driving table 3, connection driving body 2 and reel driving table 3 are more smoothly connected with each other. Also, when cassette is unloaded, connection driving body 2 and reel hub 4b are smoothly separated.

As described above, the connection driving body which is rotatably connected with the cassette holder so as to be moved up and down, is connected with reel driving table when the cassette holder drops down. Accordingly, the connection driving body is relatively moved up and connected with the reel hub of the tape reel. Therefore, the cassette loading apparatus for the cassette player according to the present invention eradicates the inferior loading operation of a cassette, which occurs in the conventional apparatus, and minimizes noise which is generated during the loading of the cassette.

What is claimed is:

1. A cassette loading apparatus for a cassette player in which a tape cassette having an internal tape reel is inserted into a movable holder and is moved and loaded together with the holder onto a reel driving table for driving the tape reel, said apparatus comprising:

a connection driving body having a connection portion which is engageable with the reel driving table, said connection driving body being rotatably mounted to said holder and linearly movable, with respect to said holder, between a first position wherein said connection driving body is received in a reel hub of the tape reel and a second position wherein said connection driving body is withdrawn from the hub;

a guide protrusion formed on said connection driving body, said guide protrusion being engageable with a reel hub of the tape reel when said connecting driving body is in said first position; and wherein said connection driving body is in said first position when the cassette is loaded onto said reel driving table.

2. The cassette loading apparatus for the cassette player as claimed in claim 1, wherein said connection portion of said connection driving body is provided with a female gear portion, and said reel driving table which is connected with said connection driving body is provided with a male gear portion which is connected with said female gear portion.

3. The cassette loading apparatus for the cassette player as claimed in claim 1, wherein said connection driving body is installed in said holder so as to be resiliently biased towards said second position by means of a spring.

4. A cassette loading apparatus for a cassette player including a cassette holder having a bottom plate and a reel driving table, the cassette holder loading a tape cassette having an internal tape reel and a reel hub onto the reel driving table for driving the internal tape reel, the apparatus including:

a recess portion formed on the bottom plate of the cassette holder for loading the tape cassette onto the reel driving table so as to drive the internal tape reel;

a connection driving body including a connection portion which is engageable with the reel driving table, said connection driving body being rotatably mounted to said holder in said recess portion and linearly movable, with respect to said holder, between a first position wherein said connection driving body is received in a reel hub of the tape reel and a second position wherein said connection driving body is withdrawn from the hub; and a guide protrusion formed on said connection driving body, said guide protrusion being engaged with the reel hub when in said first position wherein said connection driving body is received in the reel hub.

5. The cassette loading apparatus as claimed in claim 4, wherein said connection portion of said connection driving body includes a female gear portion.

6. The cassette loading apparatus as claimed in claim 5, wherein the reel driving table includes a male gear portion for mating with said female gear portion.

7. The cassette loading apparatus as claimed in claim 4, wherein there are a plurality of guide protrusions formed on said connection driving body and engaged with the reel hub when said connection driving body is in said first position.

8. The cassette loading apparatus as claimed in claim 7, wherein said connection driving body includes an outer circumferential surface, and wherein the plurality of guide protrusions are formed at predetermined intervals on the outer circumferential surface of said connection driving body.

9. The cassette loading apparatus as claimed in claim 4, further comprising a spring, and wherein said connection driving body is disposed in the cassette holder so as to be resiliently biased toward the reel driving table by said spring.

* * * * *